April 28, 1931.  L. C. SCHWALBACH  1,803,137
RECEPTACLE AND COVER
Filed April 6, 1929
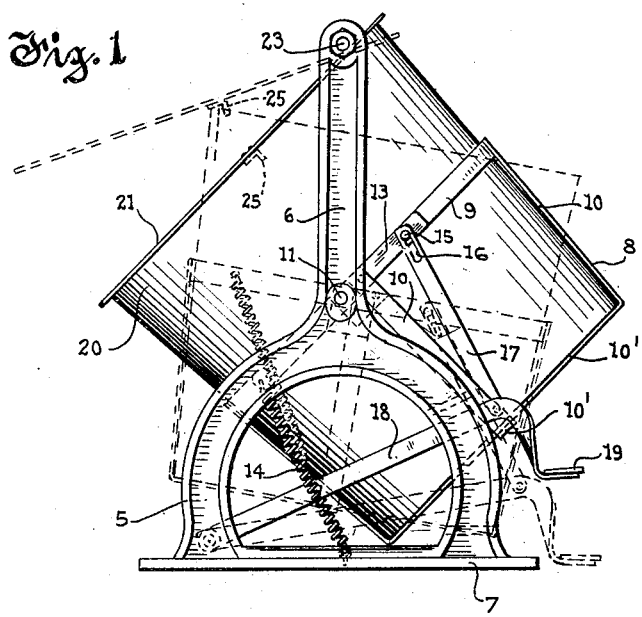
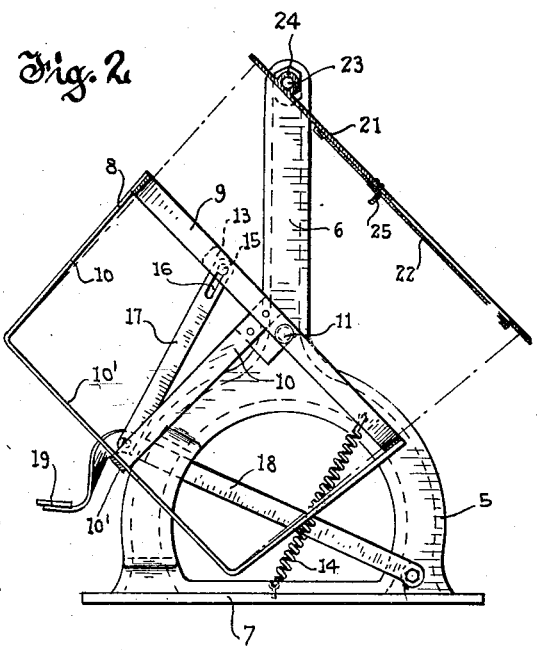
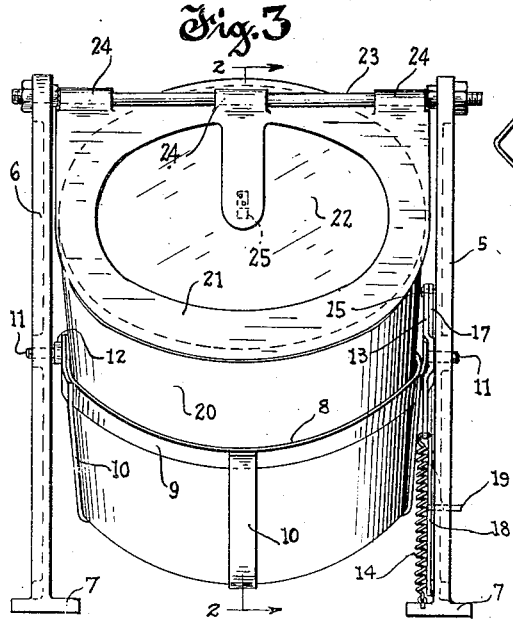
INVENTOR.
Louis C. Schwalbach
BY
Morsell, Keeney, & Morsell
ATTORNEYS.

Patented Apr. 28, 1931

1,803,137

UNITED STATES PATENT OFFICE

LOUIS C. SCHWALBACH, OF MILWAUKEE, WISCONSIN

RECEPTACLE AND COVER

Application filed April 6, 1929. Serial No. 353,109.

This invention relates to improvements in receptacles and covers.

In meat markets, grocery stores, and the like, bulk butter and lard is usually kept in large wooden tubs or pails closed by a loose, removable cover. The clerk in vending some of the commodity contained in the pail must remove the cover and if it is temporarily set on the floor, sawdust or other loose foreign matter may adhere to the inner surface of the cover and when the same is replaced said foreign matter may drop into and contaminate the contents of the pail. In addition to this objection the clerk may neglect to replace the cover, leaving the pail open and accessible to flies and insects, and therefore, unsanitary.

It is, therefore, an object of the present invention to overcome the above objections by providing a receptacle and cover movably connected together and associated with mechanism by means of which pressure on a foot treadle will cause the receptacle to move to an uncovered position, and when pressure on the foot treadle is released the parts will automatically return to normal position wherein the pail or receptacle is closed by the cover, whereby when goods are not being dispensed from the receptacle it will always be covered, and it being impossible for the cover to be displaced and positioned in a dirt accumulating position.

A further object of the invention is to provide a receptacle, cover therefor, and holding mechanism, arranged so that the receptacle is normally disposed at an angle so that the goods therein are readily apparent to the trade through a transparent area of the cover.

A further object of the invention is to provide an operably connected together receptacle and cover of the class described, relatively movable with respect to each other to permit access to said receptacle, and having means for normally limiting said relative movement, said limiting means being releasable, however, when desired, to permit the complete detachment and removal of the receptacle for refilling or replacement.

A further object of the invention is to provide a receptacle and cover of the class described which are easily operated, are strong and durable, and are well adapted for the purposes described.

With the above and other objects in view the invention consists of the improved receptacle and cover and operating mechanism, and their parts and combinations, as set forth in the claims, and all equivalents thereof.

In the accompanying drawing in which the same reference characters indicate the same parts in all of the views:

Fig. 1 is a side view of the improved receptacle and cover and associated mechanism with the positions of the parts when the receptacle is in uncovered position being shown in dotted lines;

Fig. 2 is a sectional view of the opearting mechanism and cover taken on line 2—2 of Fig. 3 with the receptacle position shown in broken lines; and Fig. 3 is a front view of the receptacle, cover and associated mechanism.

Referring now more particularly to the drawing it will appear that the numeral 5 indicates the receptacle holder which is in the form of a pair of spaced-apart upright standards 6 with enlarged base or supporting portions 7.

A receptacle holder 8 is pivotally mounted between the lower portions of said standards 6 and said receptacle holder is of basket-like formation with an annular band 9 and a pair of U-shaped straps 10 separated from one another and depending from the band 9 with their lower portions 10' medially crossing each other and forming the bottom of the holder. Pivot studs 11 project inwardly from the standards 6 and opposite side portions of the band 9 are pivotally mounted thereon with washers or fillers 12 interposed between the band and the faces of the standards.

There is medially secured to the outer surface of the band 9 adjacent a standard 6, with a pivot stud 11 extending therethrough, an elongated arm 13, to one end of which is secured the end of a coiled spring 14. The other end portion of said coiled spring extends to and is secured to the base or supporting portion 7 of a standard 6. The other end portion of said arm carries a stud 15 which enters and is in slidable engagement with a slot 16 in the upper end portion of a link 17. The inner end portion of a foot lever 18 is pivotally secured to the base portion 5 of the standard and the lower end portion of the link 17 is pivotally secured to the forward, normally raised end portion of the foot lever. The extreme forward or outer end portion of said lever is formed as a foot pedal 19.

A pail or tub 20, such as is used to contain lard, butter, and other commodities, is adapted to be disposed within and carried by the receptacle holder 8 in the manner shown. To normally close the open end portion of said pail, a flat disc-like cover 21 is provided having an enlarged transparent area 22 of glass, mica, celluloid or the like, to permit visibility of the contents of the pail.

The opposite end portions of a rod 23 are mounted in the upper end portions of the standards 6 and the inner edge portion of the cover 21 is formed with spaced-apart bracket portions 24 through which said rod 23 extends by which means the cover 21 is pivotally mounted on the rod 23 between the standards 6, in correct closing position over the open end portion of the pail.

Normally, the receptacle holder, the pail therein, and the cover are all disposed in the positions shown in full lines in Figs. 1 and 3, with the cover securely closing the open portion of the pail. It will be observed that the receptacle holder and the pail therein are forwardly tilted so that the contents of the pail are readily apparent through the transparent area of the cover. If the clerk desired to remove or dispense any of the contents of the pail it is simply necessary for him to press downwardly on the pedal portion 19 of the foot lever 18 with his foot. This pressure will cause a downward pivotal movement of the foot lever 18, pulling with it the pivotally attached link 17. As the upper end portion of the link 17 is pivotally attached to the arm 13, which arm is rigid with the receptacle holder, there will be a downward pull on an end portion of said arm, causing a pivotal movement of the receptacle holder and the pail therein, from the full line position in Fig. 1 to the dotted line position in said figure against the tension of the coiled spring 14 which becomes stretched during this movement. During the movement of the receptacle holder and pail to the dotted line position the cover 21 is engaged by the upper portion of the pail and is tilted on the rod 23 to the dotted line position, substantially uncovering the pail and permitting access thereto. Pivotal movement of the receptacle holder and pail is limited by a lug 25 which depends from a central under portion of the cover and ultimately engages the upper rim of the pail, as in the dotted line showing in Fig. 1. However, if it is desired to remove the pail from the receptacle holder for refilling or replacement, the cover 21 may be manually raised to disengage the lug 25 from the upper rim of the pail and a further pivotal movement of the receptacle holder and pail will be permitted, such movement being sufficient to permit the pail to be raised or withdrawn from the receptacle holder, and in the extreme pivotal movement of the latter it will clear the cover. From the dotted line position of the parts shown in Fig. 1 the receptacle holder, the pail and cover are automatically returned to normal position, shown in Fig. 3, by the removal of pressure from the pedal 19, and the contraction of the spring 14 will cause a pivotal movement of the parts to normal position.

It will thus be seen that in the improved receptacle and cover the cover cannot be completely disengaged from the receptacle and associated parts so as to be temporarily displaced, and this eliminates the hazard of the cover being placed on the floor so as to accumulate on its surface foreign matter which might ultimately get into the contents of the pail upon replacement of the cover. Furthermore, after goods are dispensed from the receptacle it is automatically returned to the inclined displaying position and the cover automatically assumes its normal closing position. Furthermore, the apparatus is simple, easily operated, and is well adapted for the purposes described.

What I claim as my invention is:

1. In combination, a pivotal receptacle having an open end, a pivotally mounted cover normally resting on and closing the open end of the receptacle, lever means for pivotally moving said receptacle in a fixed arc and along the surface of the cover to cause it, while in direct engagement with the cover, to slightly raise the cover and to move away from the plane thereof, means for limiting the pivotal movement of the receptacle with respect to the cover, said means being releasable by a manual lifting of the cover, and spring means for automatically returning the receptacle to normal position with a simultaneous gravitation of the cover to normal closing position.

2. In combination, a pair of spaced, upright supporting standards, a pivot rod connecting the upper end portions of the same, an open ended receptacle mounted in said holder, a cover hingedly carried directly by said pivot rod and normally closing the open end of said receptacle, a foot lever pivotally connected to a standard, a link between the foot lever and the receptacle holder, and a spring connected between the receptacle holder and a standard, a depression of the foot lever causing a pivotal movement in a constant arc of the receptacle holder in contact with and along the surface of the cover to free the open end portion of the receptacle from the major portion of the cover, said cover carrying a depending rigid lug engageable with the receptacle side edge portion to limit the pivotal movement of the receptacle holder.

In testimony whereof, I affix my signature.

LOUIS C. SCHWALBACH.